(12) United States Patent
Pirri et al.

(10) Patent No.: US 10,214,154 B2
(45) Date of Patent: Feb. 26, 2019

(54) VEHICLE SEAT INCLUDING A SUPPORT FOR A VIDEO DEVICE

(71) Applicant: Lear Corporation, Southfield, MI (US)

(72) Inventors: Armando Pirri, Desio (IT); Monica Maiolatesi, Settala (IT)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/703,255

(22) Filed: Sep. 13, 2017

(65) Prior Publication Data

US 2018/0079368 A1    Mar. 22, 2018

Related U.S. Application Data (60) Provisional application No. 62/398,118, filed on Sep. 22, 2016.

(51) Int. Cl.
| | | |
|---|---|---|
| *B60R 11/02* | (2006.01) | |
| *B60K 35/00* | (2006.01) | |
| *B60R 11/00* | (2006.01) | |
| *B60N 2/68* | (2006.01) | |

(52) U.S. Cl.
CPC .......... *B60R 11/0229* (2013.01); *B60K 35/00* (2013.01); *B60K 2350/106* (2013.01); *B60K 2350/921* (2013.01); *B60K 2350/941* (2013.01); *B60N 2/68* (2013.01); *B60R 2011/0015* (2013.01)

(58) Field of Classification Search
CPC ........ B60R 11/0229; B60R 2011/0015; B60K 35/00; B60K 2350/921; B60N 2/68

USPC .................................................... 297/188.04
See application file for complete search history.

(56) References Cited

U.S. PATENT DOCUMENTS

| | | | |
|---|---|---|---|
| RE33,423 E | 11/1990 | Lobanoff | |
| 6,198,502 B1 * | 3/2001 | Watkins | B60R 11/0211 348/148 |
| D670,295 S | 11/2012 | Prescott et al. | |
| 8,561,863 B2 | 10/2013 | LaColla et al. | |
| 8,794,700 B2 | 8/2014 | Brawner | |
| 9,278,648 B2 | 3/2016 | Ackeret et al. | |
| 2008/0252798 A1 * | 10/2008 | Vitito | B60K 35/00 348/837 |
| 2012/0162891 A1 | 6/2012 | Tranchina et al. | |
| 2013/0107449 A1 | 5/2013 | Su et al. | |
| 2016/0137140 A1 * | 5/2016 | Lee | B60R 11/0252 297/188.05 |
| 2017/0028927 A1 * | 2/2017 | Harris | B60N 2/882 |
| 2017/0174146 A1 * | 6/2017 | Kipp | B60R 11/02 |

* cited by examiner

*Primary Examiner* — Mark R Wendell
(74) *Attorney, Agent, or Firm* — MacMillan, Sobanski & Todd, LLC (57) ABSTRACT

An assembly includes a vehicle seat, a video support device mounted on the vehicle seat and adapted to support a video display device thereon, and a cap secured to the vehicle seat adjacent to the video support device. The vehicle seat includes an aperture, the video support device is mounted on the vehicle seat adjacent to the aperture, and a portion of the cap extends through the aperture so as to be secured to the vehicle seat. The aperture has a key slot, and the portion of the cap that extends through the aperture has a first key and a second key provided on a tubular portion of the cap such that one of the two keys engages a portion of the vehicle seat to secure the cap to the vehicle seat.

17 Claims, 10 Drawing Sheets

VEHICLE SEAT INCLUDING A SUPPORT FOR A VIDEO DEVICE

CROSS-REFERENCE TO RELATED APPLICATIONS

This application claims the benefit of U.S. Provisional Application No. 62/398,118, filed Sep. 22, 2016, the disclosure of which is incorporated herein by reference.

BACKGROUND OF THE INVENTION

This invention relates in general to vehicle seats. In particular, this invention relates to an improved structure for a vehicle seat that includes a support for supporting a video display or other device.

SUMMARY OF THE INVENTION

This invention relates to a video support device that may be mounted to a back of a vehicle seat so as to allow a video display device, such as a tablet computer or notebook computer, or other device to be inserted therein for viewing from the rear seat of the vehicle. The system further includes a cap that conceals an anchor system used to mount the video support device. The cap may be used on the seat back regardless of whether the video support device is installed or not installed in the vehicle. The system allows the fasteners to stay secured within the anchor system but concealed, even when the video support device is not installed. This alleviates a need to store mounting components (e.g., fasteners) within the vehicle when the video support device is not installed. In addition, only a single mounting point is utilized by the cap regardless of whether the video support device is installed or not.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
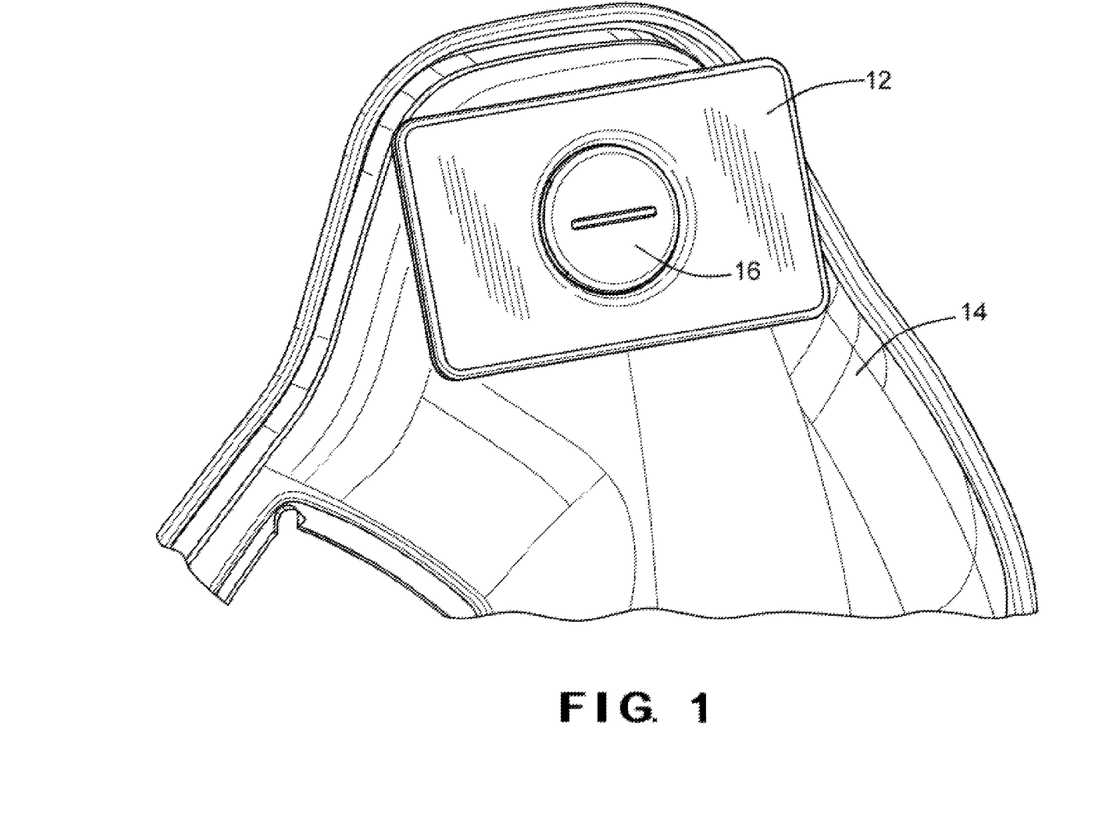
FIG. 1 is a perspective view of an upper rear portion of a vehicle seat having a video support device and a cap mounted thereon in accordance with this invention.

Referring now to the drawings, there is illustrated in FIG. 1 a portion of a vehicle seat 14 having a video support device 12 and a cap 16 mounted thereon in accordance with this invention. The illustrated portion of the vehicle seat 14 is an upper rear portion of a conventional seat back panel that is a portion of a frame structure of the vehicle seat back, although such is not required. As will be discussed in greater detail below, the illustrated video support device 12 is mounted to the back panel of the vehicle seat 14 by means of an anchor system in accordance with this invention. The video support device 12 may be used to support a conventional video display device (such as a tablet or notebook computer, for example) or other device. The illustrated video support device 12 is generally rectangularly-shaped for supporting a corresponding rectangularly-shaped video display device. However, it should be understood that the vehicle support device 12 may have any shape or configuration and may support a video display device having any shape or configuration. The cap 16 is disposed over the anchor system to provide visual improvements (i.e., beautification) to an otherwise exposed anchor system.

Figure 2:
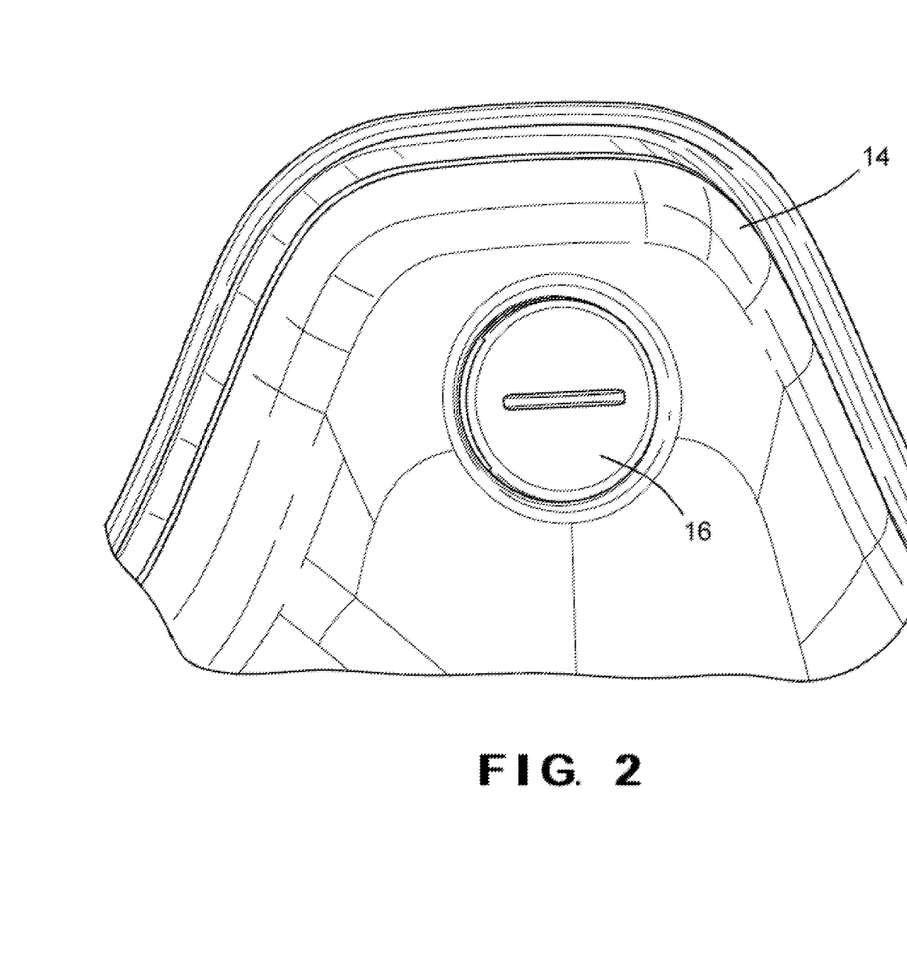
FIG. 2 is a perspective view similar to FIG. 1 wherein the video support device has been removed.

FIG. 2 illustrates the back panel of the vehicle seat 14 having the cap 16 secured to the vehicle seat 14 when the video support device 12 is removed and, therefore, not utilized. As will be described below, the cap 16 can be secured to the back panel of the vehicle seat 14 regardless of whether or not the video support device 12 is being utilized. The installation and retention of the cap 16 requires no added external hardware or tools, and the features and configuration of the cap 16 allow the cap 16 to be secured to the back panel of the vehicle seat 14 either with or without the video support device 12. Therefore, because the cap 16 can be always mounted to the back panel of the vehicle seat 14 under either configuration, the cap 16 may always be utilized. Consequently, the cap 16 does not need to be stored elsewhere in the vehicle or other location and retrieved for later use.

Figure 3:
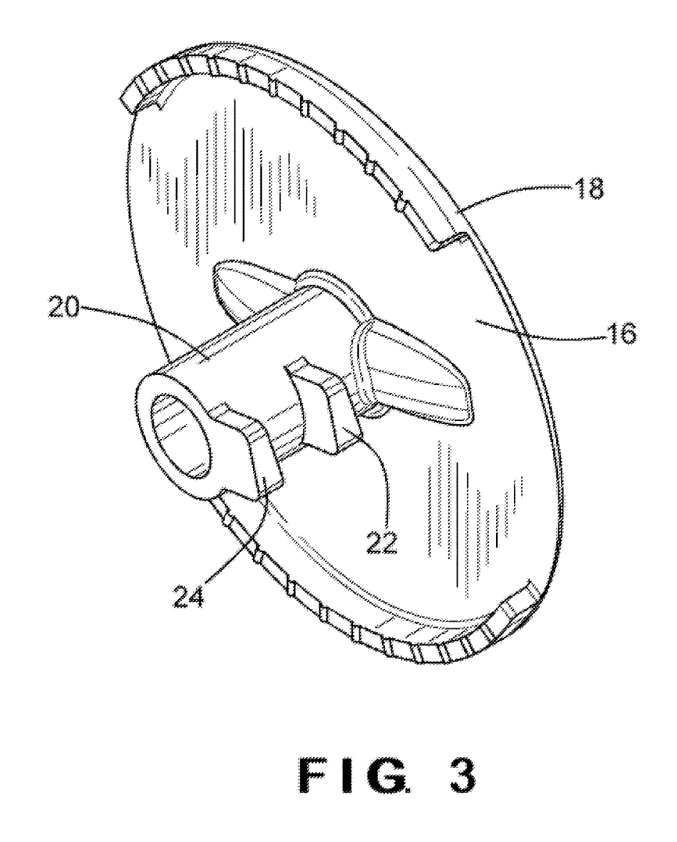
FIG. 3 is a rear perspective view of the cap shown in FIGS. 1 and 2.

The structure of the cap 16 is illustrated in detail in FIG. 3. As shown therein, the cap 16 includes a disk portion 18 and a tubular portion 20. Preferably, the disk portion 18 and the tubular portion 20 are formed from a single piece of a plastic material. Alternatively, the disk portion 18 and the tubular portion 20 may be formed as separate components and connected together by any type desired process, and further may be formed from any desired materials or combination of materials. The illustrated disk portion 18 is a substantially circular disk, although such is not required. The tubular portion 20 extends substantially perpendicular to the disk portion 18, although again such is not required.

The tubular portion 20 of the cap 16 includes a first key 22 and a second key 24 that are axially offset from one another. The first key 22 and the second key 24 are used to secure the cap 16 to the back panel of the vehicle seat 14, regardless of whether the video support device 12 is mounted thereon. The first key 22 is used to secure the cap 16 to the back panel of the vehicle seat 14 when the video support device 12 is not mounted thereon, while the second key 24 is used to secure the cap 16 to the back panel of the vehicle seat 14 when the video support device 12 is mounted thereon.

Figure 4:
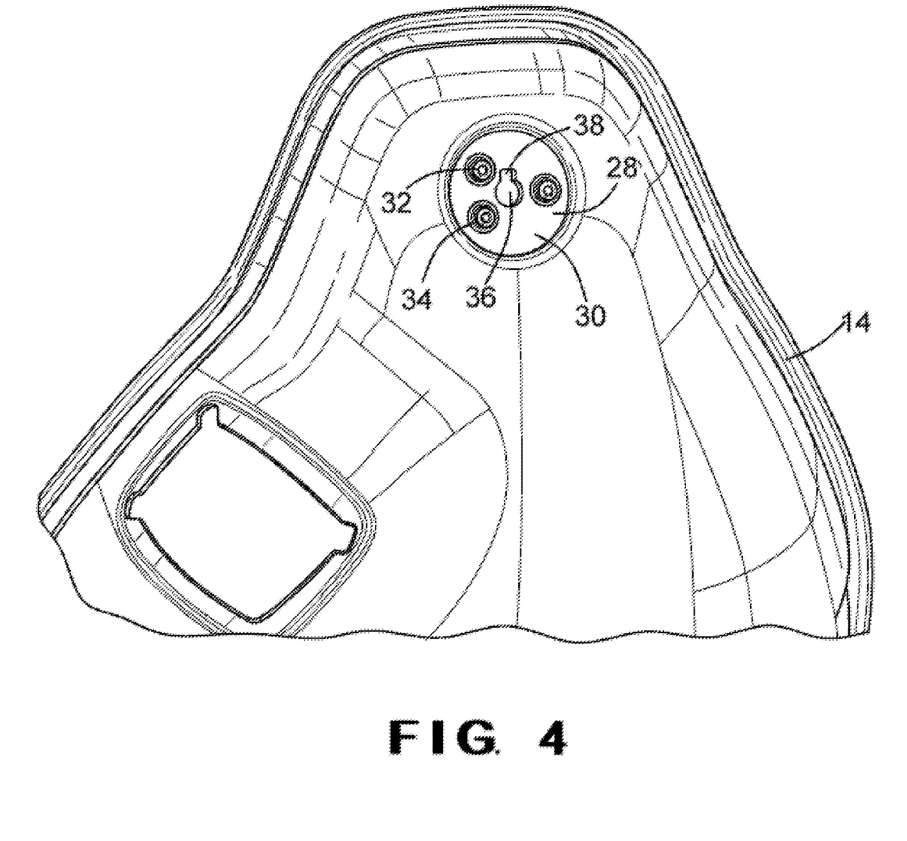
FIG. 4 is a perspective view similar to FIGS. 1 and 2 wherein both the video support device and the cap have been removed to show an anchor system for supporting the video support device as shown in FIG. 1.
Figure 5:
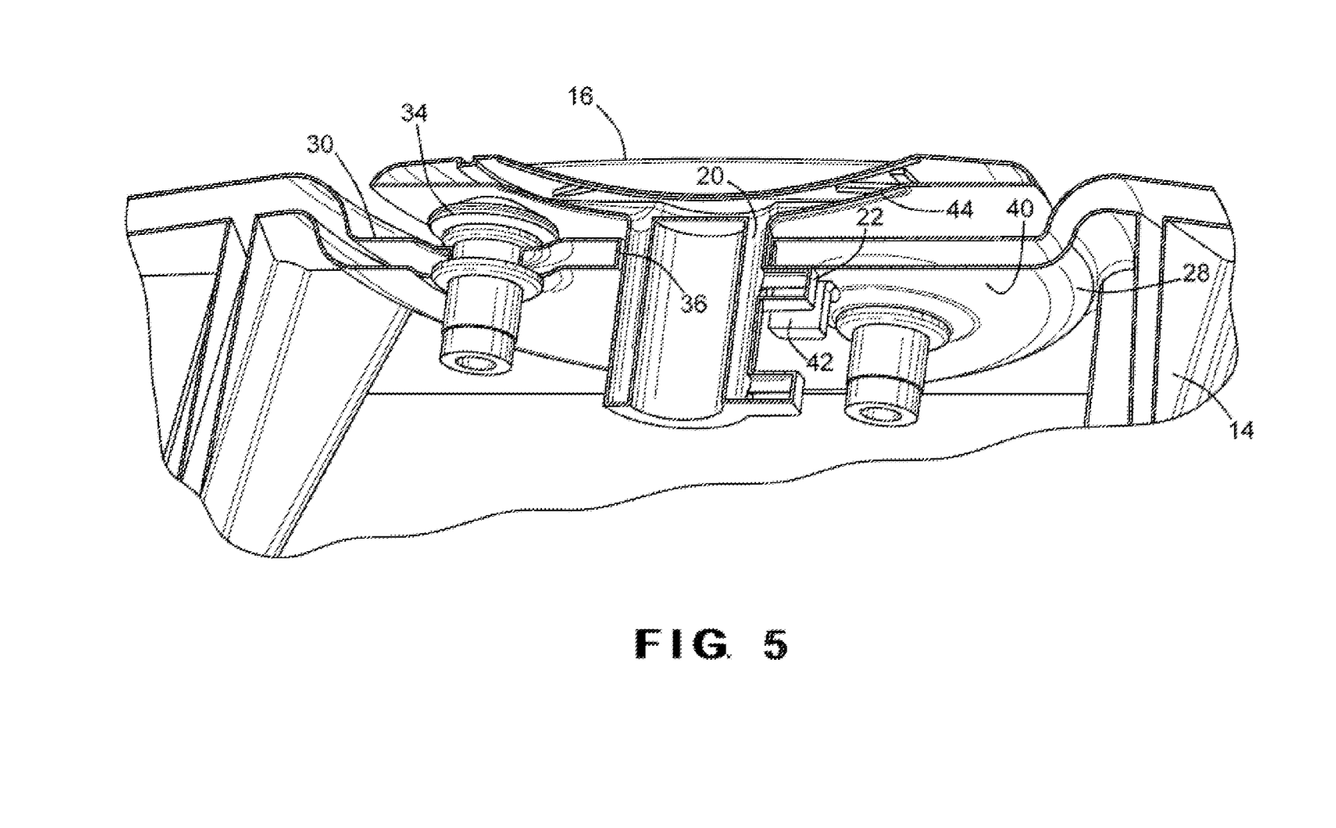
FIG. 5 is a sectional perspective view showing the anchor system having the cap secured thereto.
Figure 6:
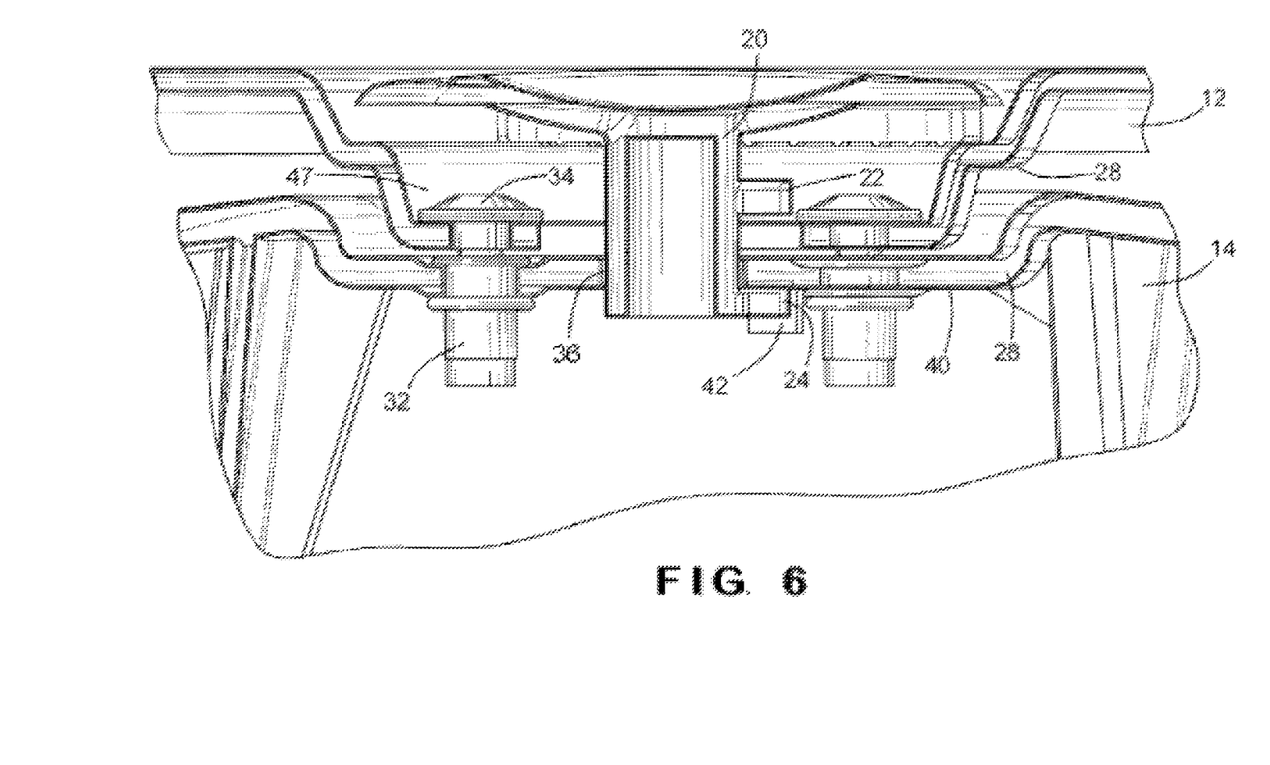
FIG. 6 is a sectional perspective view similar to FIG. 5 showing the anchor system having both the video support device and the cap secured thereto.

FIGS. 4, 5, and 6 illustrate an anchor system 28 disposed within the back panel of the vehicle seat 14 for supporting the video support device 12 thereon. The anchor system 28 includes a generally circular recessed pocket 30 that is formed as part of the back panel of the vehicle seat 14 for receiving the cap 16 and/or the video support device 12 therein. The anchor system 28 also includes a plurality (three in the illustrated embodiment, although a greater or lesser number may be provided) of fastener receiving sockets 32 that are located within the recessed pocket 30. The receiving sockets 32 may include, but are not limited to, a threaded female socket for receiving threaded fasteners 34 therein. The receiving sockets 32 may be provided in the back panel of the vehicle seat 14 by any desired process. For example, the receiving sockets 32 may be insert-molded to the back panel of the vehicle seat 14. The anchor system 28 further includes a central aperture 36 having a key slot 38 for receiving the tubular portion 20 and one or both of the keys 22 and 24 of the cap 16.

FIG. 5 is a sectional perspective view showing the cap 16 mounted to the anchor system 28 of the back panel of the vehicle seat 14 when the video support device 12 is not utilized. The tubular member 20 of the cap 16 is inserted within the central aperture 36 of the anchor system 28 by initially aligning the first key 22 and second key 24 with the key slot 38. When so aligned, the first key 22 and second key 24 are inserted through the key slot 38 until both of them extend inwardly beyond an inner wall 40 of the anchor system 28. Then, the cap 16 is manually rotated (such as by substantially ninety degrees, for example) until the first key 22 abuts a stop tab 42, which prevents the cap 16 from rotating further. The distance between an inner side surface 44 of the disk portion 18 and the first key 22 is substantially the same distance as the thickness as a wall of the anchor system 28. This creates an interference condition between the first key 22 and the inner side surface 44 of the disk portion 18 for preventing undesired rotation of the cap 16. When so installed, the cap 16 is preferably fully seated and secured within the recessed portion 30 of the back panel of the vehicle seat 14 when the video support device 12 is not utilized. This improves the aesthetic appearance of the back panel of the vehicle seat 14. Because the anchor system 28 is concealed by the cap 16, the plurality of fasteners 34 (which would otherwise be exposed) are concealed. As a result, the fasteners 34 will be maintained in the vehicle seat 14 and available for use should the video support device 12 be used.

FIG. 6 is a cross sectional view of the cap 16 mounted to the anchor system 28 when the video support device 12 is utilized. The video support device 12 includes a recessed portion 47 that seats within the recessed portion 30 of the anchor system 28. The fasteners 34 are fastened to the receiving sockets 32 for securing the video support device 12 to the anchor system 28 of the vehicle seat 14. The tubular portion 20 is inserted within the aperture 36 by aligning the first key 22 and second key 24 with the key slot. When the second key 24 extends beyond an inner wall 40 of the anchor system 28, the cap 16 is manually rotated (such as by substantially ninety degrees, for example) until the second key 24 abuts the stop tab 42, which prevents the cap 16 from rotating further. Similar to FIG. 5, an interference condition is created between the second key 24 and the inner wall 40 of the anchor system 28 for preventing undesired rotation of the cap 16. Moreover, a material (such as leather, for example) covering the video support device 12 is compressible, which allows pressure to be placed on the cap 16 to compress the material as the cover is rotated to allow movement (i.e., rotation) of the cap 16. When the cap 16 reaches the stop position and the pressure is relieved on the cap 16, the material becomes uncompressed, thereby creating an interference condition for preventing undesired rotation of the cap 16. The cap 16 is fully seated and secured against the video support device 12 and provides beautification of the seat back, which otherwise would expose the mounting bolts of the video support device 12.

Figure 7:
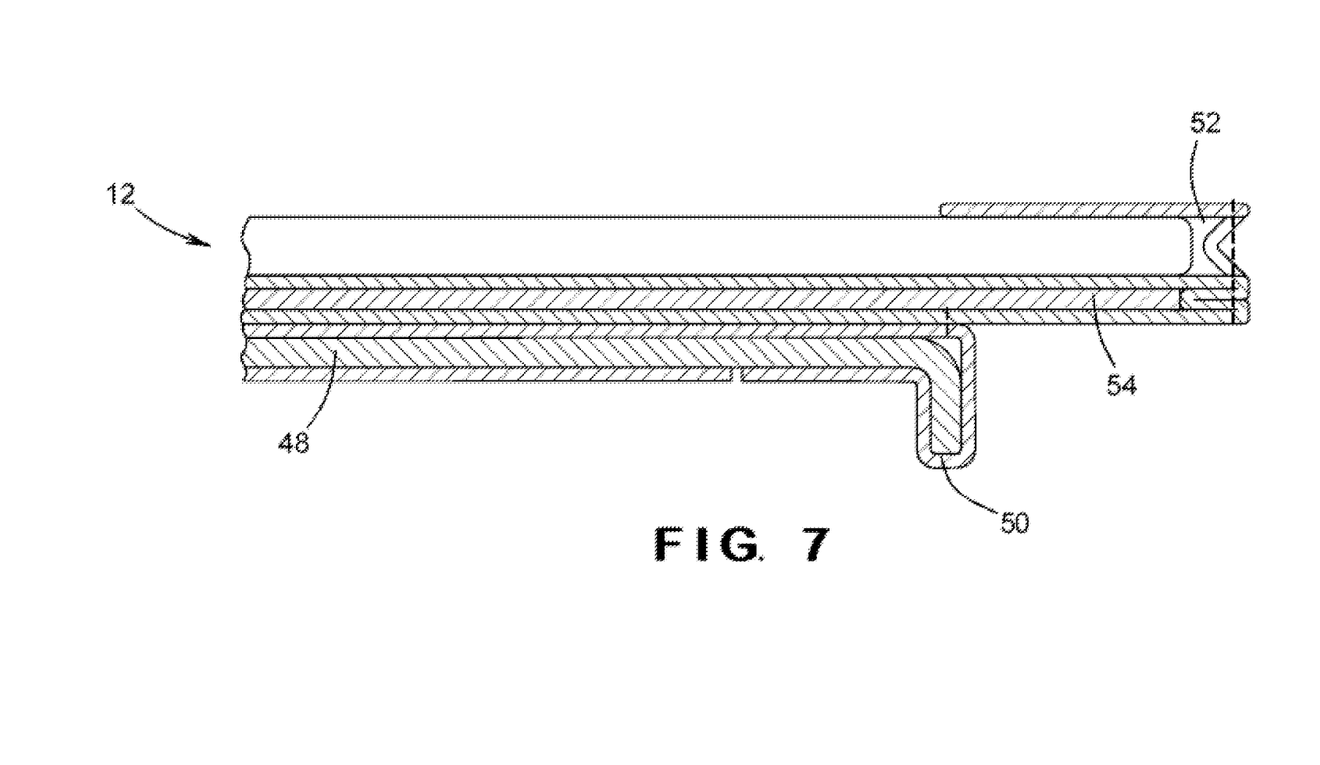
FIG. 7 is a sectional elevational view of portions of the video support device and a video display device supported thereon.

FIG. 7 is a cross sectional view of the video support device 12. The video support device 12 includes a support frame 48 that mounts the video support device 12 to the vehicle seat 14. The support frame 48 is preferably formed from a plastic (or other material) by means of thermoforming, which is a manufacturing process where a plastic sheet is heated to a pliable forming temperature. It is thereafter formed to a specific shape in a mold and trimmed to generate a backing for the video support device 12. The support frame 48 may be encased in a cover 50 that is formed from alcantara. As is well known, alcantara is a covering material that is made from a combination of polyester and polyurethane. The combination of the two materials provides increased durability and stain resistance.

The video support device 12 further includes a compartment 52 for housing the video device. The compartment 52 is preferably made of a leather material, although such is not required. The leather material may be selected to match the leather material of the seat back of the vehicle seat 14 to blend in with the external material of the seat back. While leather is preferably used to match the material of the seat back, other types of material may be used. The compartment 52 includes a display opening 54 to allow a user to view a screen of the video device housed in the compartment 52 as well as access any of the controls.

The compartment 52 includes an access slot 58 for receiving the video device. Preferably, the access slot 58 is located on a side of the compartment 52. The video device is secured within the compartment 52 utilizing a fastening structure including, but not limited to, conventional hook and loop material. The hook and loop material may be a strap or may be adhered to both sides of the slot opening for maintaining the slot 58 in a closed position.

The compartment 52 may further include a backing reinforcement plate 54 to maintain a planar shape of the compartment 52 and provide rigid structural support for the video device when inserted in the compartment 52. The backing reinforcement plate 54 is made from a plastic material, although other materials that provide the necessary structural support may be used. The backing reinforcement plate 54 is enclosed within a pocketed region behind the compartment 52. The compartment 52 and backing reinforcement plate 54 may be larger than the support frame 48 such that the perimeter of the compartment 52 and backing reinforcement plate 54 extend beyond a perimeter of the support frame 48. The compartment 52 and backing reinforcement plate 54 both include apertures for allowing the cover to access the anchor system.

Figure 8:
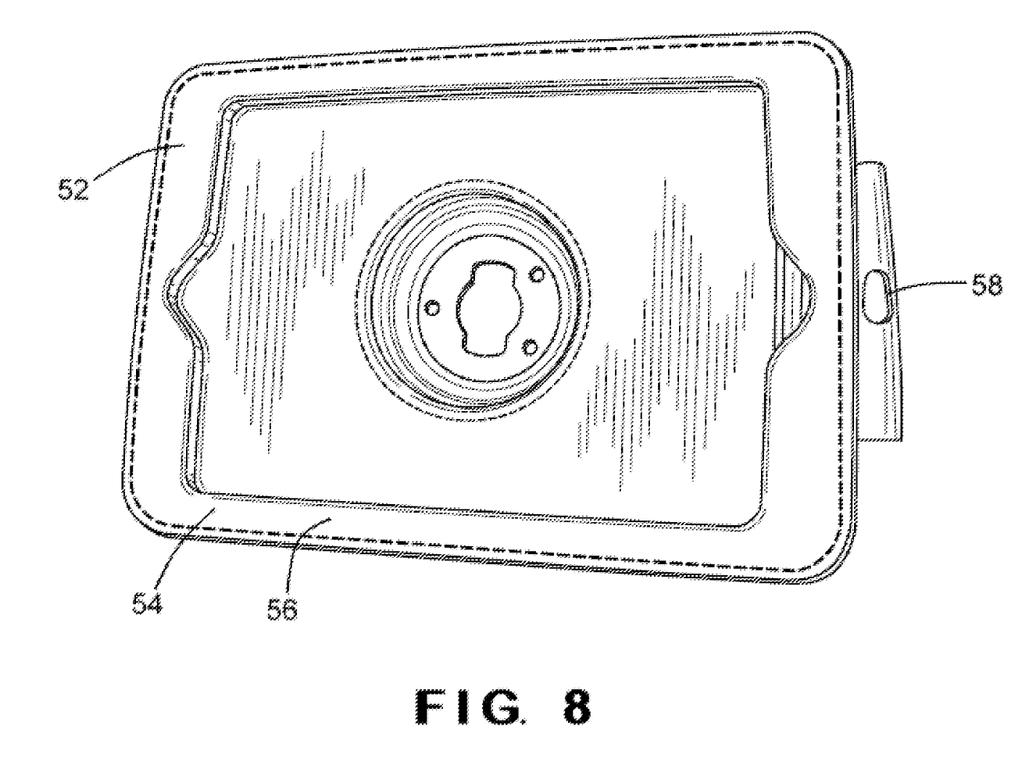
FIG. 8 is a front perspective view of the video support device without the cap.

FIG. 8 is a front view of the video support device 12 illustrating the display opening and aperture for allowing the cap 16 access to the anchor system of the seat back panel 14. The display opening 54 includes a border 56 that provides sufficient support for retaining the video device within the compartment 52, while still allowing the display of the video device to be viewed. The borders 56 may further include cutaway sections to allow access to controls of the video display. Also shown is the hook and loop strap 58 for securing the video device within the side slot 60 of the compartment 52.

Figure 9:
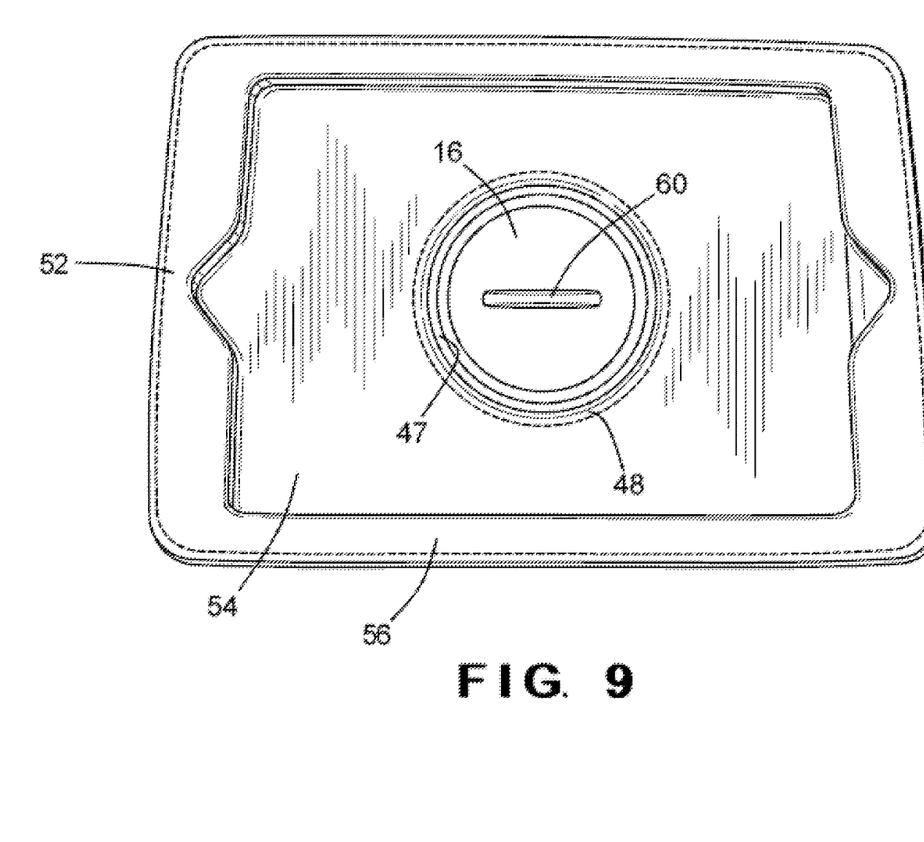
FIG. 9 is a front perspective view of the video support device including the cap.

FIG. 9 is a front view of the video support device 12 with the cap 16. As shown in FIG. 9, the cap 16 is secured within the recessed portion 47 of the support frame 48 and is secured to the seat back panel 14. The cap 16 improves the visual appearance by concealing the fasteners. The cap 16 may also include a slot 60 on the disk portion 18 in which a tool or similar may be inserted to assist in rotating the cap 16.

Figure 10:
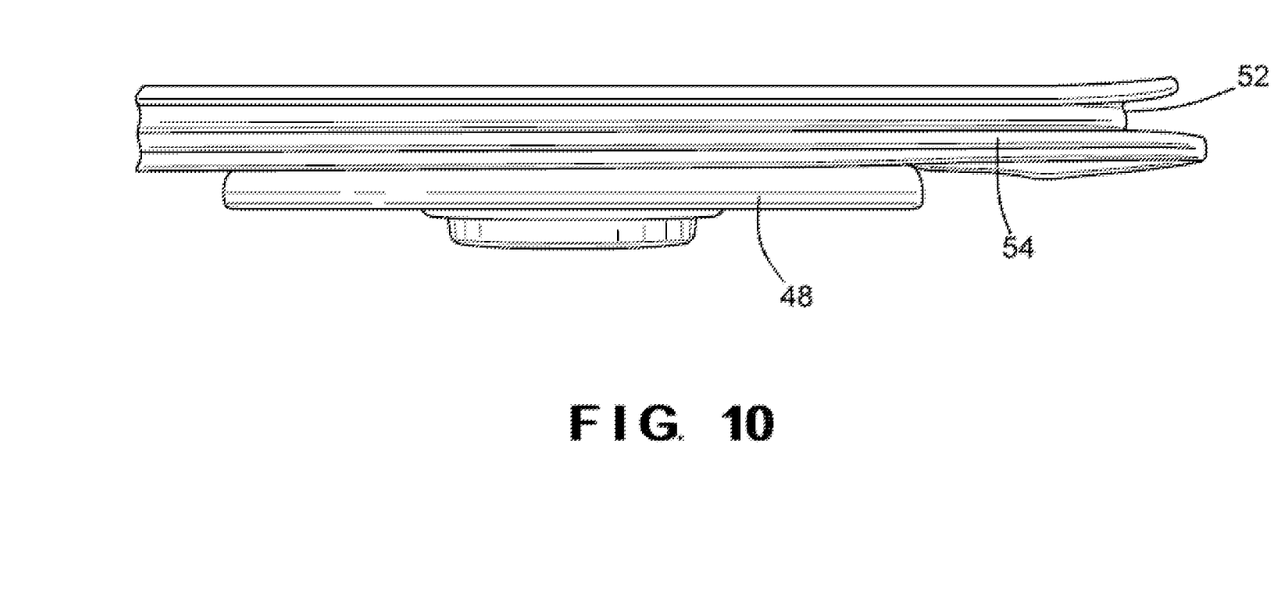
FIG. 10 is a side elevational view of a portion of the video support device.

FIG. 10 is a side view of the video support device 12. As shown, the compartment 52 with the reinforcement backing plate 54 is mounted to the support frame 48. The compartment 52 may be mounted to the support frame 48 by any suitable fastening process including, but not limited to, an adhesive or a glue.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An assembly comprising:
a vehicle seat including an aperture having a key slot;
a video support device mounted on the vehicle seat and adapted to support a video display device thereon; and
a cap including a portion having a key provided thereon that extends through the aperture such that the key engages a portion of the vehicle seat to secure the key to the vehicle seat adjacent to the video support device.

2. The assembly defined in claim 1 wherein the vehicle seat includes a frame structure, the video support device is mounted on the frame structure of the vehicle seat, and the cap is secured to the frame structure of the vehicle seat.

3. The assembly defined in claim 1 wherein the key is a first key, and wherein a second key is provided on the portion of the cap such that one of the two keys engages a portion of the vehicle seat to secure the cap to the vehicle seat.

4. The assembly defined in claim 3 wherein the first key and the second key are axially offset from one another.

5. The assembly defined in claim 1 wherein the vehicle seat includes an anchor system for supporting the video support device thereon.

6. The assembly defined in claim 5 wherein the anchor system includes a recessed pocket for receiving the cap and/or the video support device therein.

7. The assembly defined in claim 6 wherein the recessed pocket is generally circular and is formed as part of the back panel of the vehicle seat.

8. The assembly defined in claim 6 wherein the recessed pocket is formed as part of a frame structure of the vehicle seat.

9. The assembly defined in claim 6 wherein one or more fastener receiving sockets are located within the recessed pocket, and wherein one or more fasteners cooperate respectively with the one or more fastener receiving sockets for supporting the video support device on the vehicle seat.

10. The assembly defined in claim 1 wherein the video support device includes a support frame that mounts the video support device to the vehicle seat.

11. The assembly defined in claim 1 wherein the video support device further includes a compartment for housing the video device.

12. The assembly defined in claim 11 wherein the compartment includes an access slot for receiving the video device.

13. The assembly defined in claim 11 wherein the compartment further includes a fastening structure for retaining the video device therein.

14. An assembly comprising:
a vehicle seat including an aperture;
a video support device mounted on the vehicle seat and including an opening, the video support device adapted to support a video display device thereon; and
a cap including a portion that extends through the opening of the video support device and through the aperture of the vehicle seat such that the cap is secured to the vehicle seat.

15. The assembly defined in claim 14 wherein the aperture has a key slot, and wherein the portion of the cap has a key provided thereon that extends through the aperture and the key slot such that the key engages a portion of the vehicle seat to secure the cap to the vehicle seat.

16. The assembly defined in claim 15 wherein the aperture has a key slot, and wherein the portion of the cap has first and second keys provided thereon that extend through the aperture and the key slot such that one of the first and second keys engages a portion of the vehicle seat to secure the cap to the vehicle seat.

17. The assembly defined in claim 16 wherein the first and second keys are axially offset from one another.

* * * * *

UNITED STATES PATENT AND TRADEMARK OFFICE
CERTIFICATE OF CORRECTION

| | | |
|---|---|---|
| PATENT NO. | : 10,214,154 B2 | Page 1 of 1 |
| APPLICATION NO. | : 15/703255 | |
| DATED | : February 26, 2019 | |
| INVENTOR(S) | : Pirri et al. | |

It is certified that error appears in the above-identified patent and that said Letters Patent is hereby corrected as shown below:

On the Title Page

Item (72) Inventor is corrected to read:
-- Armando Pirri, Desio, (IT);
Monica Maiolatesi, Settala, (IT);
Fabrizio Malegori, Arcore, (IT) --.

Signed and Sealed this
Eighteenth Day of February, 2020

Andrei Iancu
*Director of the United States Patent and Trademark Office*